Jan. 10, 1928.  1,656,147
G. DU B. DE BOZAS
WIRELESS APPARATUS FOR DETERMINING ANGLES OR DIRECTIONS
Filed June 16, 1925
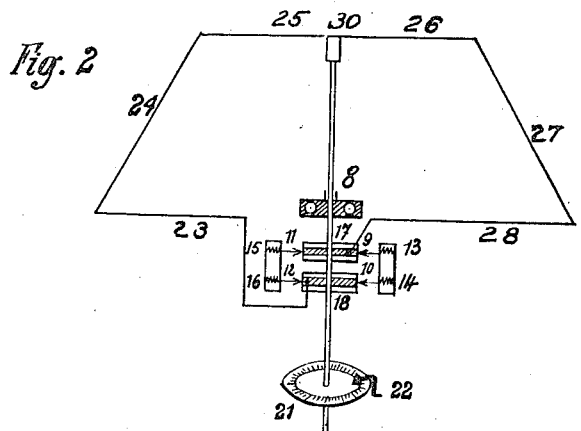
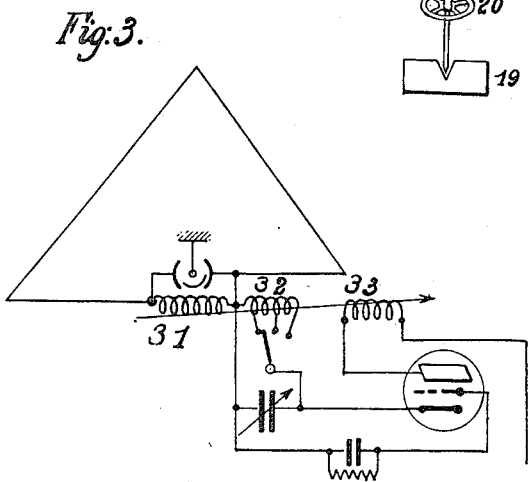
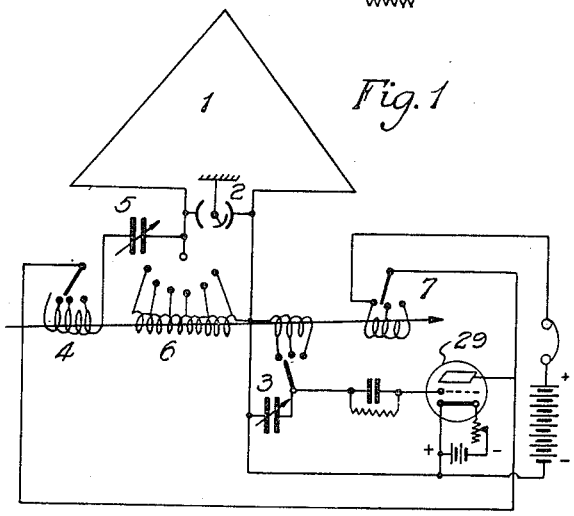
Inventor:
Guy du Bourg de Bozas
per Fred F. Barlow
Attorney Patented Jan. 10, 1928.

1,656,147

UNITED STATES PATENT OFFICE.

GUY DU BOURG DE BOZAS, OF PARIS, FRANCE.

WIRELESS APPARATUS FOR DETERMINING ANGLES OR DIRECTIONS.

Application filed June 16, 1925, Serial No. 37,588, and in France June 21, 1924.

This invention relates to wireless direction finding apparatus and is more particularly intended for use for determining directions in connection with short wave transmissions, although it is not exclusively limited thereto and is of the type in which a frame aerial or its equivalent is provided to which is rigidly coupled a circuit adapted to be tuned to the waves to be received, the frame being adapted to be turned into various directions with reference to scale or the like, in order to enable the direction to be determined.

According to the invention the frame aerial, which is preferably constituted by a single turn is not tuned but is compensated electrostatically, and is responsive to all wave lengths. It can thus impulse the ancillary circuit rigidly coupled thereto by any waves received having the lengths to which the said circuit is tuned. As the frame aerial is not tuned it does not cause reaction of the coupling between itself and the tuned ancillary circuit to which it is coupled, during rotation of the frame. The note received is therefore stable and does not sustain variations. Further as it is not necessary to adjust the resonance of the frame the controls are greatly simplified.

In order that the said invention may be clearly understood, it will now be described with reference to the accompanying drawings, the three figures of which show various diagrams of apparatus constructed and arranged according to the invention.

Fig. 1 illustrates one of the practical applications of the principles of the invention to a wireless direction finder suitable for short waves.

In Fig. 1, 1 is a frame aerial which is not tuned to the waves to be received, which is electrostatically compensated at 2 and which is coupled to a tuned circuit 3 which is the input or grid circuit of the triode valve 29. 4 is an inductance mounted on a variometer and 5 a condenser connected in a feed back or reaction circuit as shown. 6 is an inductance enabling the coupling of the frame with the circuit to be varied. 7 is a tapped inductance whose flux may be used to assist the reaction of the inductance 4. It is obvious that in some cases this coil may also serve as the usual choke coil.

The device is adapted to give correct angular directions or measurements when the circuit 3, that is the input or grid circuit of the valve 29 is tuned to the wave lengths to be received.

In this way by diminishing the wave lengths of the circuit the direction of very short waves, of a few metres in length can be determined and that without troubling about the dimensions of the frame 1, which maintains its directional properties.

The receiving casing and the accumulators may be enclosed in a Faraday cage connected to earth.

Fig. 2 represents one mechanical embodiment of a frame aerial (not in tune) for connection to the receiver previously described.

The aerial consists of light metal tubes 23, 24, 25, 26, 27, 28, of high conductivity for high frequency currents, forming both a frame and a conductor.

In this way, absorption due to undesirable metallic bodies is avoided, the metallic bodies in the present case being utilized for conducting the current.

An insulator 30 insulates the frame from the metallic spindle of rotation. At the lower part of the frame is a ball race 8 guiding the rotary spindle. On the casing of this ball race are fixed contacts of silver 9, 10, 11, 12, under the influence of springs 13, 14, 15, 16, which contact with two metallic rings 17 and 18 to which the ends of the aerial are connected.

In this way electrical connection is secured between the frame and the receiving apparatus.

The mechanical construction of this frame—carried by a single metallic spindle extending to the top of the frame and resting on a base—permits it to be placed either on the ground, in a room, on a motor car, or on a ship or the like.

By the use of a connecting sleeve placed in proximity to ball race 8, the frame for short waves may be quickly replaced by a frame for longer waves, mounted on the same support, which may thus serve for carrying any one of several frames.

The rotating spindle is supported at its lower end either by a ball bearing, or it may be provided with a cone engaging in a base 19.

A hand wheel 20 serves to turn the spindle. 21 is a scale graduated in degrees turning with the whole device and co-operating with a pointer 22 which indicates in degrees the geographical orientation of the frame.

Fig. 3 shows a wireless direction finder in which the frame aerial, which is compensated and not tuned, is coupled at 31 in the extension of an oscillating circuit 32, on which reacts the reactance coil 33 in connection with the plate of the detector valve.

This arrangement permits tuning to waves of high amplitude.

The method of operation consists in the first place in tuning the receiving circuit to the waves to be received. Then the whole is turned in a horizontal plane. When the coiled windings no longer cut the magnetic flux, a reduction of sound is noticed in the telephone. The axis of the bobbin or winding then indicates the direction of the transmitting station which is being sought.

What I claim and desire to secure by Letters Patent of the United States of America is:—

1. A radio goniometer comprising an untuned loop aerial having so few turns that it has relatively high conductivity for short waves, means for compensating said loop aerial electrostatically, an oscillating circuit, a self inductance coil connected to said oscillating circuit and means for operatively connecting said loop aerial to said coil.

2. A radio goniometer comprising an untuned loop aerial having so few turns that it has relatively high conductivity for short waves, means for compensating said loop aerial electrostatically, an oscillating circuit, a self inductance coil conductively and inductively connected to said oscillating circuit and means for operatively connecting said loop aerial to said coil.

3. A radio goniometer comprising a rotatable single turn untuned loop aerial, means for compensating said loop aerial electrostatically, an oscillating circuit, a self inductance coil connected to said oscillating circuit, means for operatively connecting said loop aerial to said coil.

4. A radio goniometer comprising a rotatable single turn untuned loop aerial, means for compensating said loop aerial electrostatically, an oscillating circuit, a self inductance coil conductively and inductively connected to said oscillating circuit and means for operatively connecting said loop aerial to said coil.

5. A radio goniometer comprising a rotatable single turn loop aerial, means for compensating said loop aerial electrostatically, an oscillating circuit, a self inductance coil connected to said oscillating circuit, means for operatively connecting said loop aerial and variable means including a coil and a condenser for introducing reaction to said inductance coil.

6. A radio goniometer comprising a rotatable single turn loop aerial, means for compensating said loop aerial electrostatically, an oscillating circuit, a self inductance coil connected to said oscillating circuit, means for operatively connecting said loop aerial and variable means including a coil and a condenser for introducing reaction to said oscillating circuit.

In witness whereof I affix my signature.

GUY DU BOURG DE BOZAS.